United States Patent
Sonzogni et al.

(10) Patent No.: US 6,776,346 B1
(45) Date of Patent: Aug. 17, 2004

(54) SECURED ACCESS DEVICE WITH CHIP CARD APPLICATION

(75) Inventors: Jacques Sonzogni, Fuveau (FR); Mark Trimmer, Belper (GB)

(73) Assignee: STMicroelectronics SA, Montrouge (FR)

( * ) Notice: Subject to any disclaimer, the term of this patent is extended or adjusted under 35 U.S.C. 154(b) by 0 days.

(21) Appl. No.: 09/914,315

(22) PCT Filed: Feb. 24, 2000

(86) PCT No.: PCT/FR00/00465
§ 371 (c)(1),
(2), (4) Date: Aug. 24, 2001

(87) PCT Pub. No.: WO00/51087
PCT Pub. Date: Aug. 31, 2000

(30) Foreign Application Priority Data

Feb. 25, 1999 (FR) .............................................. 99 02363

(51) Int. Cl.[7] .............................................. G06K 19/06
(52) U.S. Cl. ........................ 235/492; 235/487; 235/375; 235/380; 235/382
(58) Field of Search ................................ 235/492, 375, 235/380, 382, 437; 711/163

(56) References Cited

U.S. PATENT DOCUMENTS

| | | | |
|---|---|---|---|
| 4,797,542 A | 1/1989 | Hara | ........................... 235/380 |
| 4,831,245 A | 5/1989 | Ogasawara | ................... 235/492 |
| 4,930,129 A | 5/1990 | Takahira | ..................... 371/40.4 |
| 4,985,921 A | 1/1991 | Schwartz | ....................... 380/24 |
| 5,165,043 A | * 11/1992 | Miyahara et al. | ............ 235/380 |
| 5,500,949 A | * 3/1996 | Saito | ............................ 711/100 |
| 5,678,027 A | * 10/1997 | Pockrandt et al. | ........... 711/163 |
| 5,715,431 A | * 2/1998 | Everett et al. | ............... 711/156 |
| 5,761,528 A | * 6/1998 | Arai | ................................ 710/2 |

FOREIGN PATENT DOCUMENTS

EP 0766211 4/1997 ............. G07F/7/10

* cited by examiner

*Primary Examiner*—Michael G. Lee
*Assistant Examiner*—Steven S. Paik
(74) *Attorney, Agent, or Firm*—Lisa K. Jorgenson; Allen, Dyer, Doppelt, Milbrath & Gilchrist, P.A.

(57) ABSTRACT

Disclosed is a device for secured access to applications of a chip card, bringing into operation instructions that provide information, at each point in time, on the rights, especially in terms of access to the chip card, of a software component or a hardware action performed in the chip card. In the case of each new software component and at each new hardware action, a register R of the microprocessor of the chip card stores a specific code that makes it possible to check the authorized nature of the operations of access to the memory of the chip card that are performed by the new software component or hardware action.

38 Claims, 1 Drawing Sheet

FIG_1 (PRIOR ART)

FIG_2

SECURED ACCESS DEVICE WITH CHIP CARD APPLICATION

This application is a 371 of PCT/FR00/00465, filed Feb. 24, 2000.

BACKGROUND OF THE INVENTION

1. Field of the Invention

The present invention relates to a secured access device with chip card applications.

More specifically, the invention relates to a device for secured access to chip card applications that uses especially instructions which, at each instant, provide information on rights, especially in terms of access to the memory of the chip card, the software component or the hardware operation that has been performed in the chip card.

2. Description of the Prior Art

The most common type of chip card has a microprocessor that manages a program memory. The program memory is usually dedicated to a single application or a set of applications loaded at the same time into the chip card. When several applications are loaded into a chip card, they have a close relationship with one another and are all designed for one and the same type of service. Thus, for example, a chip card cannot simultaneously play the role of a bank card and that of a customer loyalty card for a business of any kind.

In order to end this situation where each chip card has to be limited to one type of application, new software architectures are being considered. These new software architectures are making use of the development of standardized programming languages (for example the language "JAVA") which resolve the problems of portability.

Figure 1:
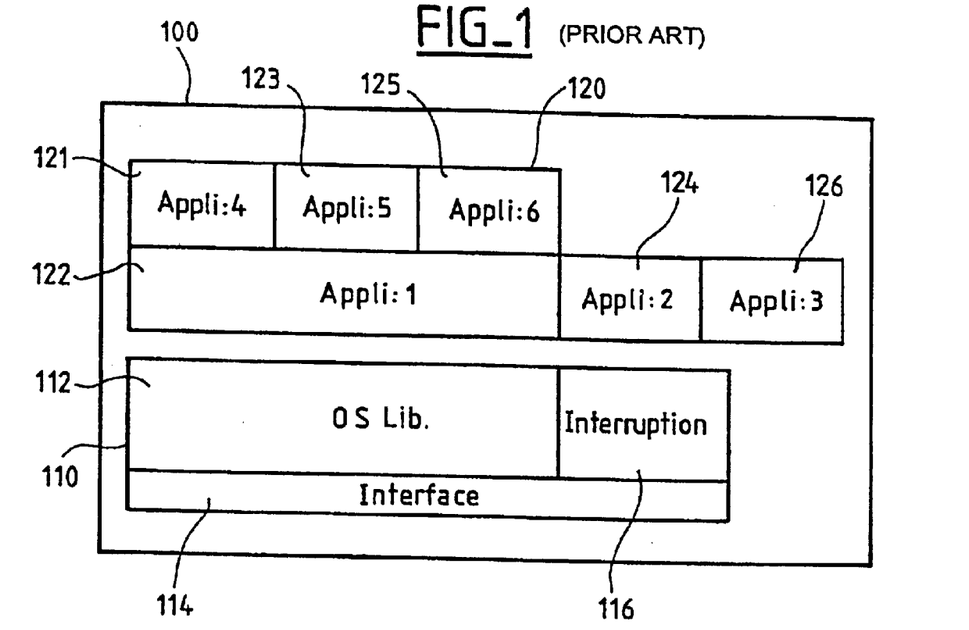
FIG. 1, already described, is a simplified view of a software architecture of the chip card projects currently being developed.

FIG. 1 is a simplified view of a software architecture of the chip card projects that are now being developed. The architecture shown in FIG. 1 comprises, in particular, a first part 110 that corresponds to what is called the software architecture of a chip card 100 and a second part 120 that corresponds to what is called the applications part of the software architecture of the chip card 100. The system part 110 of the chip card is essentially formed by a library of programs 112 of the chip card operating system, an interface 114 to manage the interactions with, for example, the microprocessor of the chip card or else the different memories of the chip card and a space for the management of hardware interruptions 116.

The applications part 120 of the software architecture consists of different applications:

- a first, second and third main application, respectively 122, 124 and 126;
- a first, second and third additional application, respectively 121, 123 and 125.

The main applications 122, 124 and 126 are written in a programming language that can be directly understood by the processor of the chip card.

The additional applications 121, 123 and 125 are typically applications encoded in a standardized language. These applications may be added at any point in time to the system part 110 in an applications part 120 of the software architecture described. In FIG. 1, the additional applications 121, 123 and 125 depend directly on the first main application 122. The first main application 122 herein serves as an interpreter between the additional applications and the operating system by converting the codes of the additional applications into a machine language that can be understood by the programs of the operating system 112.

The device with secured access to applications of a chip card according to the invention comes into play in an architecture of this type.

The software architecture that has just been described is more complex than the one currently existing in chip cards in circulation. Indeed, the architecture described assumes that it is possible to add applications in a standardized programming language, possibly after the chip card is put into circulation. It is therefore more complicated to achieve a satisfactory level of security than was the case when a single application or a group of applications dedicated to a single chip card function was loaded once and for all into the chip card which was then permanently limited in terms of available applications. The risk that a new application might disturb the working of previous applications was therefore not as great.

The coexistence of applications of different kinds in one and the same chip card may raise a certain number of problems. For example, a software architecture simultaneously containing an application dedicated to the assessment of a customer's loyalty to a gasoline company and a standard banking application must ensure that a secret key used in the banking application cannot be read during the use of the application associated with the gasoline company.

SUMMARY OF THE INVENTION

It is an object of the present invention to overcome the problems that have just been described.

To this end, the invention proposes a device enabling the management of different software applications that are installed possibly at different times, or different hardware events, of a chip card while providing for high security. Thus, the device according to the invention offers the possibility of detection when the user of an application tries to exceed his rights for example by attempting to access data not intended for the application in question.

To achieve these goals, the invention proposes to set up specific instructions internal to the microprocessor of the chip card. These specific instructions are call instructions (DCALL) and return instructions (DRETURN). These call and return instructions are associated according to the invention with specific registers by which it can be ascertained that the operations performed by the application during execution in the chip card are authorized or not authorized.

The invention therefore pertains to a device for access to applications of a chip card comprising a microprocessor associated with an operating system working with a set of instructions, a program memory and a battery of applications in a memory of the chip card, wherein the device comprises:

- a register of the microprocessor to store a code, on several check bits, proper to an entity brought into play,
- a call instruction and an instruction for the return of the set of instructions to instantaneously and automatically update the register during the action by a new entity,
- a checking device for the checking, as a function of the check bits, of the authorized character of the access to the zones of the memory of the chip card by the new entity that is called or comes into action in the chip card,
- a first link to transmit the check bits from the microprocessor to the checking device.

According to a particular embodiment of the device of the invention, each new entity taking action is activated at a predefined address of a ROM (read-only memory) type memory of the chip card.

According to different embodiments of the invention, the entity working in the chip card may be an application of the battery of applications or a hardware event, or again the operating system associated with the microprocessor of the chip card.

BRIEF DESCRIPTION OF THE DRAWINGS

The various aspects and advantages of the invention shall appear more clearly hereinafter in the following description made with reference to the appended figures which are given purely by way of an indication and in no way restrict the scope of the invention and which are now introduced.

Figure 2:
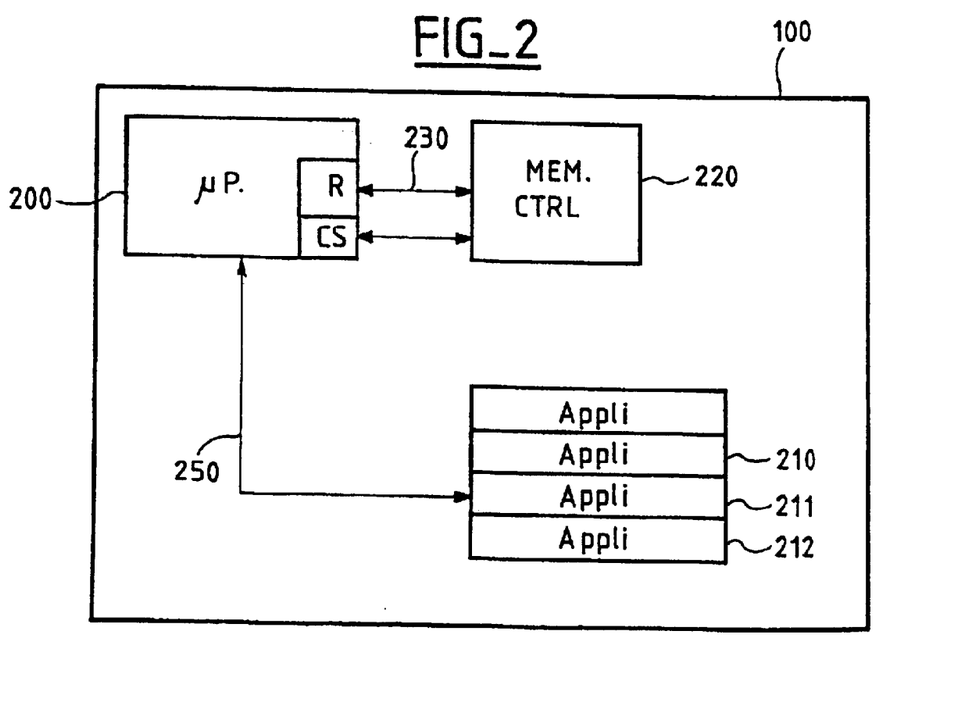
FIG. 2 is a depiction of the principle of operation according to the invention during the execution of an application within the chip card.

In FIG. 2, a microprocessor 200 of a chip card 100 manages the set of operations of a battery of applications 210 of the chip card 100.

MORE DETAILED DESCRIPTION

A two-way bus 250 exchanges information between the microprocessor 200 and any application of the battery of applications 210. The information exchanged may be data elements, addresses or control instructions. A controller of access to the memory 220 exchanges information with the microprocessor 200, especially by means of a link 230 which conveys a signal, called a control signal between the microprocessor 200 and the controller providing access to the memory 220.

For example, when an entity such as the application 211, by means of a two-way bus 250, requires the intervention of another entity such as an application 212, it sends a call instruction DCALL followed by a designation of the entity called and a parameter enabling the nature of the call to be determined. According to the invention, a register R is updated during such calls. A certain number of bits of the register R then assume a value associated with the called entity. The register R is therefore a hardware means of the microprocessor 200 used to store a code proper to the entity of the software architecture that is being performed, and to control its field of execution.

Furthermore, the device according to the invention may also take account of instructions known as hardware instructions, for example instructions of the resetting type. Instructions known as hardware instructions are events that may occur in real time on a chip card and generate interruptions in the microprocessors of the chip cards. This type of event is managed by the device according to the invention in the same way as the software instructions: the bits of the register R take a very precise value, appropriate to each real-time event that acts on the chip cards, thus limiting and controlling the rights pertaining to these events.

The information given by the register R is thus capable of checking a piece of information, for example at the microprocessor or any other entity external to the software architecture, on the identification of the zone of the software architecture concerned by the application being executed.

The information given by the register R enables the checking of the zone of the memory of the chip card in which the application is entitled to come into action, namely the memory space that it is permitted to access. Thus, any user attempting to make fraudulent use of the operating system in order to recover data pertaining to a particular application is refused access to this data. Indeed, the bits of the state register in this case are different from the bits that might correspond to a call DCALL of the particular application in question. The addresses which it is sought to access and the bits of the register R sent by the microprocessor by means of the link 230, are compared with each other in the controller of access to the memory 220. Should it be the case that the addresses of the memory that it is sought to access are not addresses belonging to the authorized field of the last application having performed a DCALL type call, then a piece of information on illegal access prohibits access to these memories.

The device according to the invention thus provides great security in the sense that data elements destined for one application cannot be used by another application.

A second register CS makes it possible to retain in memory a code proper to the applications that were active at the last call instruction DCALL sent by the current application, namely those that are to be performed following the current application.

When the current application has finished being executed, a return instruction DRET is executed by the microprocessor and the data elements contained in the second register CS enable a return to the application that was being performed previously and had been activated by a call DCALL. The register R is also updated.

The second register CS cannot be directly accessed by the applications of the chip card. This is in order to ensure the integrity of the device when it is put into operation during the execution of a return instruction DRET.

When the execution of the current application is finished, the bits of the register R assume a value specific to the application that was being performed previously, restoring its rights and limits in terms of memory access.

The memory zone access device according to the invention gives a high level of security in terms of access to, the different zones of the memory, for a software architecture such as the one shown in FIG. 1.

What is claimed is:

1. A chip card comprising:

a microprocessor including an operating system working with a set of instructions, said microprocessor comprising a first register for storing a multibit identification code identifying an entity to be executed, the set of instructions including a call instruction for calling based upon the multibit identification code a new entity to be executed, and for updating said first register during execution of the new entity by storing therein a first label associated with the entity being executed;

a memory connected to said microprocessor for storing a plurality of application programs;

a first link connected to said microprocessor for transmitting the multibit identification code; and a checking device connected to said first link for receiving the multibit identification code, and for checking whether access to locations in said memory is authorized for the new entity by comparing the first label with a second label, the second label being associated with the plurality of application programs in said memory or with the locations in said memory, and the second label also being used for initiating reading of one of said plurality of application programs therein.

2. A chip card according to claim 1, wherein the set of instructions further includes a return instruction; and wherein said microprocessor comprises a second register and loads the multibit identification code from said first register to said second register when the call instruction is executed, and at a same time the return instruction causes the contents of said second register to be loaded into said first register.

3. A chip card according to claim 2, wherein said second register cannot be directly accessed.

4. A chip card according to claim 1, wherein the new entity to be executed is one of the plurality of application programs.

5. A chip card according to claim 1, wherein the new entity to be executed causes a hardware event.

6. A chip card according to claim 5, wherein the hardware event resets said microprocessor.

7. A chip card according to claim 1, wherein the set of instructions further includes a return instruction; and wherein said first register is updated in response to the return instruction.

8. A chip card according to claim 1, wherein said checking device provides a control signal to said microprocessor for providing access to the locations in said memory if the new entity to be executed is authorized.

9. A chip card according to claim 1, wherein the plurality of application programs are written in a standardized language.

10. A chip card comprising:
a microprocessor including an operating system working with a set of instructions including a call instruction and a return instruction, said microprocessor comprising
a first register for storing a multibit identification code identifying an application program entity to be executed, the call instruction for calling based upon the multibit identification code a new application program to be executed, and for updating said first register during execution of the new application program by storing therein a first label associated with the application program being executed, and
a second register for loading the multibit identification code from said first register to said second register when the call instruction is executed, and at a same time the return instruction causes the contents of said second register to be loaded into said first register;
a memory connected to said microprocessor for storing a plurality of application programs; and
a checking device connected to said microprocessor for receiving the multibit identification code, and for checking whether access to locations in said memory is authorized for the new application program by comparing the first label with a second label, the second label being associated with the plurality of application programs in said memory or with the locations in said memory, and the second label also being used for initiating reading of one of said plurality of application programs therein.

11. A chip card according to claim 10, wherein said second register cannot be directly accessed.

12. A chip card according to claim 10, wherein each application program causes a hardware event.

13. A chip card according to claim 12, wherein the hardware event resets said microprocessor.

14. A chip card according to claim 10, wherein said first register is automatically updated in response to the return instruction.

15. A chip card according to claim 10, wherein said checking device provides a control signal to said microprocessor for providing access to the locations in said memory if the new application program to be executed is authorized.

16. A method for securing access to a chip card comprising a microprocessor including an operating system working with a set of instructions including a call instruction, and a memory connected to the microprocessor for storing a plurality of application programs, the method comprising:
storing a multibit identification code in a first register identifying an entity to be executed;
calling a new entity to be executed based upon the multibit identification code stored in the first register;
updating the first register during execution of the new entity by storing therein a first label associated with the entity being executed; and
transmitting the multibit identification code from the microprocessor to a checking device, and checking whether access to locations in the memory is authorized for the new entity by comparing the first label with a second label, the second label being associated with the plurality of application programs in the memory or with the locations in the memory, and the second label also being used for reading one of the plurality of application programs therein.

17. A method according to claim 16, wherein the set of instructions further includes a return instruction; and wherein the microprocessor comprises a second register and loads the multibit identification code from the first register to the second register when the call instruction is executed, and at a same time the return instruction causes the contents of the second register to be loaded into the first register.

18. A method according to claim 17, wherein the second register cannot be directly accessed.

19. A method according to claim 16, wherein the new entity to be executed is one of the plurality of application programs.

20. A method according to claim 16, wherein the new entity to be executed causes a hardware event.

21. A method according to claim 20, wherein the hardware event resets the microprocessor.

22. A method according to claim 16, wherein the set of instructions further includes a return instruction; and wherein the first register is updated in response to the return instruction.

23. A method according to claim 16, wherein the checking comprises providing a control signal to the microprocessor for providing access to the locations in the memory if the new entity to be executed is authorized.

24. A method according to claim 16, wherein the plurality of application programs are written in a standardized language.

25. A method for securing access to a chip card comprising a microprocessor and a memory connected thereto for storing a plurality of application programs, the microprocessor including an operating system working with a set of instructions including a call instruction and a return instruction, the method comprising:
storing a multibit identification code in a first register for identifying an application program to be executed;
calling a new application program to be executed based upon the multibit identification code;
updating the first register during execution of the new application program by storing therein a first label associated with the application program being executed;
loading the multibit identification code from the first register to a second register when the call instruction is executed, and at a same time the return instruction causes the contents of the second register to be loaded into the first register; and transmitting the multibit identification code from the microprocessor to a checking device for checking whether access to locations in the memory is authorized for the new application program by comparing the first label with a second label, the second label being associated with the plurality of application programs in the memory or with the locations in the memory, and the second label also being used for initiating reading of one of the plurality of application programs therein.

26. A method according to claim 25, wherein the second register cannot be directly accessed.

27. A method according to claim 25, wherein each application program causes a hardware event.

28. A method according to claim 27, wherein the hardware event resets the microprocessor.

29. A method according to claim 25, wherein the first register is updated in response to the return instruction.

30. A method according to claim 25, wherein checking comprises providing a control signal to the microprocessor for providing access to the locations of the memory if the new application program is authorized.

31. A chip card comprising:

a microprocessor;

a memory connected to said microprocessor for storing a plurality of application programs;

said microprocessor comprising a first register for storing a first code, on at least one check bit, corresponding to a first application program to be executed from said plurality of application programs;

if execution of said first application program requires intervention of a second application program from said plurality of application programs, then said first application program sends a call instruction to said microprocessor requesting such intervention;

said first register being updated based upon the call instruction for storing a second code, on the at least one check bit, corresponding to said second application program to be executed; and a checking device connected to said microprocessor for checking the second code as to whether access to locations in said memory are authorized for said second application program.

32. A chip card according to claim 31, wherein said microprocessor comprises a second register for storing the first code corresponding to said first application program while said second application program is being executed; said first register also being updated based upon the first code.

33. A chip card according to claim 32, wherein after said microprocessor executes said second application program, said first register enables said microprocessor to return to said first application program.

34. A chip card according to claim 32, wherein said second register cannot be directly accessed.

35. A chip card according to claim 31, wherein said first and second application programs are written in a standardized language.

36. A chip card according to claim 35, wherein said first and second application programs are loaded into said memory after the chip card has been fabricated.

37. A chip card according to claim 31, wherein said checking device provides a control signal to said microprocessor for providing access to the locations of said memory if said second application program is authorized.

38. A chip card according to claim 31, wherein said checking device compares the address locations to be accessed in said memory with the second code in said first register.

* * * * *

UNITED STATES PATENT AND TRADEMARK OFFICE
CERTIFICATE OF CORRECTION

PATENT NO. : 6,776,346 B1  Page 1 of 6
APPLICATION NO. : 09/914315
DATED : August 17, 2004
INVENTOR(S) : Sonzogni et al.

It is certified that error appears in the above-identified patent and that said Letters Patent is hereby corrected as shown below:

Please delete the Title page and Column 1 line 1 thru Column 8 line 36 and insert the Title page and Column 1 line 1 thru Column 8 line 23 as attached.

Signed and Sealed this

Twenty-seventh Day of July, 2010

David J. Kappos
*Director of the United States Patent and Trademark Office*

United States Patent
Sonzogni et al.

(12)

(10) Patent No.: US 6,776,346 B1
(45) Date of Patent: Aug. 17, 2004

(54) SECURED ACCESS DEVICE WITH CHIP CARD APPLICATIONS

(75) Inventors: Jacques Sonzogni, Fuveau (FR); Mark Trimmer, Belper (GB)

(73) Assignee: STMicroelectronics SA, Montrouge (FR)

( * ) Notice: Subject to any disclaimer, the term of this patent is extended or adjusted under 35 U.S.C. 154(b) by 0 days.

(21) Appl. No.: 09/914,315
(22) PCT Filed: Feb. 24, 2000
(86) PCT No.: PCT/FR00/00465
   § 371 (c)(1),
   (2), (4) Date: Aug. 24, 2001
(87) PCT Pub. No.: WO00/51087
   PCT Pub. Date: Aug. 31, 2000

(30) Foreign Application Priority Data

Feb. 25, 1999 (FR) .................................. 99 02363

(51) Int. Cl.⁷ .............................................. G06K 19/06
(52) U.S. Cl. .................... 235/492; 235/487; 235/375; 235/380; 235/382
(58) Field of Search ...................... 235/492, 375, 380, 235/382, 437; 711/163

(56) References Cited

U.S. PATENT DOCUMENTS

| 4,797,542 | A |   | 1/1989  | Hara ............................ 235/380 |
| 4,831,245 | A |   | 5/1989  | Ogasawara ................. 235/492 |
| 4,930,129 | A |   | 5/1990  | Takahira ..................... 371/40.1 |
| 4,985,921 | A |   | 1/1991  | Schwartz .................... 380/24 |
| 5,165,043 | A | * | 11/1992 | Miyahara et al. ........... 235/380 |
| 5,500,949 | A | * | 3/1996  | Saito ........................... 711/100 |
| 5,678,027 | A | * | 10/1997 | Pockrandt et al. .......... 711/163 |
| 5,715,431 | A | * | 2/1998  | Everett et al. ............... 711/156 |
| 5,761,528 | A | * | 6/1998  | Arai ............................. 710/2 |

FOREIGN PATENT DOCUMENTS

EP  0766211  4/1997

* cited by examiner

*Primary Examiner*—Michael G. Lee
*Assistant Examiner*—Steven S. Paik
(74) *Attorney, Agent, or Firm*—Lisa K. Jorgenson; Allen, Dyer, Doppelt, Milbrath & Gilchrist, P.A.

(57) ABSTRACT

A device for secured access to applications of a chip card executes instructions that provide information on the rights for accessing the chip card with respect to a software component or a hardware action performed in the chip card. For each new software component and at each new hardware action, a register of the microprocessor of the chip card stores a specific code for checking the authorized nature of the operations performed by the new software component or hardware action for accessing the memory of the chip card.

38 Claims, 1 Drawing Sheet

SECURED ACCESS DEVICE WITH CHIP CARD APPLICATIONS

FIELD OF THE INVENTION

The present invention relates to a secured access device for chip card applications. More specifically, the invention relates to a device for secured access to chip card applications that uses instructions that have been performed in the chip card which, at each instant, provide information on rights for accessing the memory of the chip card, the software component, or the hardware operation that has been performed in the chip card.

BACKGROUND OF THE INVENTION

The most common type of chip card has a microprocessor that manages a program memory. The program memory is usually dedicated to a single application or a set of applications loaded at the same time into the chip card. When several applications are loaded into a chip card, they have a close relationship with one another, and are all designed for the same type of service. Thus, for example, a chip card cannot simultaneously play the role of a bank card and that of a customer card for another type of business.

In order to end this situation where each chip card has to be limited to one type of application, new software architectures are being considered. These new software architectures are making use of the development of standardized programming languages which resolve the problems of portability, such as the programming language JAVA, for example.

FIG. 1 is a simplified view of a software architecture of the chip cards that are now being developed. The architecture shown in FIG. 1 includes, in particular, a first part 110 that corresponds to the software architecture and a second part 120 that corresponds to the applications part of the software architecture for the chip card 100. The system part 110 is essentially formed by a library of programs 112 for the operating system of the chip card, an interface 114 to manage the interactions with the microprocessor or the different memories of the chip card, and a space for the management of hardware interruptions 116.

The applications part 120 of the software architecture includes different applications, such as a first, second and third main application, respectively 122, 124 and 126, and a first, second and third additional application, respectively 121, 123 and 125. The main applications 122, 124 and 126 are written in a programming language that can be directly understood by the processor of the chip card.

The additional applications 121, 123 and 125 are typically applications encoded in a standardized language. These applications may be added at any point in time to the system part 110. In FIG. 1, the additional applications 121, 123 and 125 depend directly on the first main application 122. The first main application 122 herein serves as an interpreter between the additional applications and the operating system by converting the codes of the additional applications into a machine language that can be understood by the programs of the operating system 112.

The software architecture that has just been described is more complex than the one currently existing in chip cards in circulation. The architecture described assumes that it is possible to add applications in a standardized programming language, possibly after the chip card is put into circulation. It is therefore more complicated to achieve a satisfactory level of security compared to when a single application or a group of applications dedicated to a single chip card function are the only applications to be loaded into the chip card. The chip card was then permanently limited in terms of available applications. The risk that a new application might disturb the operation of previous applications was therefore not as great.

The coexistence of applications of different kinds in the same chip card may raise a certain number of problems. For example, a software architecture simultaneously containing an application dedicated to the assessment of a customer's access to a gasoline company and a standard banking application must ensure that a secret key used in the banking application cannot be read during the use of the application associated with the gasoline company.

SUMMARY OF THE INVENTION

It is an object of the present invention to overcome the problems that have just been described.

A device is provided that enables the management of different software applications that are installed, possibly at different times, or the management of different hardware events of a chip card while providing high security. Thus, the device according to the invention offers the possibility of detection when the user of an application tries to exceed his rights, for example, by attempting to access data not intended for the application in question.

To achieve this objective, the device sets up specific instructions internal to the microprocessor of the chip card. These specific instructions are call instructions and return instructions. These call and return instructions are associated with specific registers for determining whether the operations performed by the application are authorized.

The invention therefore pertains to a device for accessing applications of a chip card comprising a microprocessor associated with an operating system working with a set of instructions, a program memory, and one or more applications in a memory of the chip card.

The device comprises a register of the microprocessor to store a code on several check bits proper to an entity brought into play. Also included are a call instruction, and an instruction for the return of the set of instructions to instantaneously and automatically update the register during the action by a new entity. The device further includes a checking device for checking, as a function of the check bits, whether access to the zones or address location of the memory of the chip card by the new entity that is called or comes into action in the chip card is authorized. A first link transmits the check bits from the microprocessor to the checking device.

According to a particular embodiment of the device of the invention, each new entity being executed is activated at a predefined address of a read only memory (ROM) of the chip card. According to different embodiments of the invention, the entity operating in the chip card may be an application of the one or more applications or a hardware event, or the operating system associated with the microprocessor of the chip card.

BRIEF DESCRIPTION OF THE DRAWINGS

The various aspects and advantages of the invention shall appear more clearly hereinafter in the following description made with reference to the appended figures which are given purely by way of an indication and in no way restrict the scope of the invention, and which are now introduced:

FIG. 1 is a simplified block diagram of a software architecture for the chip cards currently being developed according to the prior art; and FIG. 2 is a block diagram illustrating the principle of operation for the execution of an application within a chip card according to the present invention. A microprocessor 200 manages the set of operations for a plurality of applications 210 of the chip card 100.

DETAILED DESCRIPTION OF THE PREFERRED EMBODIMENTS

A two-way bus 250 exchanges information between the microprocessor 200 and any application of the plurality of applications 210-212. The information exchanged may be data elements, addresses or control instructions. An access controller to the memory 220 exchanges information with the microprocessor 200 using a link 230, which conveys a control signal between the microprocessor 200 and the controller providing access to the memory 220.

When an entity such as the application 211, for example, requires the intervention of another entity, such as an application 212, it sends a call instruction DCALL using the two-way bus 250 followed by a designation of the entity called and a parameter enabling the nature of the call to be determined. According to the invention, a register R is updated during such calls. A certain number of bits of the register R then assume a value associated with the called entity. The register R is therefore a hardware component of the microprocessor 200 used to store a code proper to the entity of the software architecture that is being performed, and to control its field of execution.

Furthermore, the device according to the invention may also take into account instructions known as hardware instructions, such as resetting type instructions, for example. Instructions known as hardware instructions are events that may occur in real time and generate interruptions in the microprocessor of the chip card. This type of event is managed by the device in the same way as the software instructions. The bits of the register R take a very precise value appropriate to each real-time event affecting the chip card, thus limiting and controlling the rights pertaining to these events.

The information given by the register R is thus capable of checking information on the identification of the zone of the software architecture concerned by the application being executed. This information is checked at the microprocessor or at any other entity external to the software architecture.

The information given by the register R enables the checking of the zone of the memory of the chip card in which the application is permitted to be accessed. Thus, any user attempting to make fraudulent use of the operating system in order to recover data pertaining to a particular application is refused access to this data. The bits of the state register in this case are different from the bits that might correspond to a call instruction DCALL of the particular application in question.

The addresses to be accessed and the bits of the register R sent by the microprocessor via link 230 are compared with each other in the access controller of the memory 220. If the addresses of the memory to be accessed are not addresses belonging to the authorized field of the last application having performed a call instruction DCALL, then information on illegal access to the memory is prohibited.

The device according to the invention thus provides great security in the sense that data elements intended for one application cannot be used by another application. A second register CS makes it possible to retain in memory a code proper to the applications that were active at the last call instruction DCALL sent by the current application, namely those that are to be performed following the current application.

When the current application has completed execution, a return instruction DRET is executed by the microprocessor and the data elements contained n the second register CS enable a return to the application that was being performed previously and had been activated by a call instruction DCALL. The register R is also updated.

The second register CS cannot be directly accessed by the applications of the chip card. This is to ensure the integrity of the device when it is put into operation during the execution of a return instruction DRET. When the execution of the current application is finished, the bits of the register R assume a value specific to the application that was being performed previously, restoring its rights and limits in terms of memory access. The memory zone access device according to the invention gives a high level of security in terms of access to the different zones of the memory for a software architecture such as the one shown in FIG. 1.

What is claimed is:

1. A chip card comprising:
a microprocessor including an operating system working with a set of instructions, said microprocessor comprising a first register for storing a multibit identification code identifying an entity to be executed, the set of instructions including a call instruction for calling based upon the multibit identification code a new entity to be executed, and for updating said first register during execution of the new entity by storing therein a first label associated with the entity being executed;

a memory connected to said microprocessor for storing a plurality of application programs;

a first link connected to said microprocessor for transmitting the multibit identification code; and a checking device connected to said first link for receiving the multibit identification code, and for checking whether access to locations in said memory is authorized for the new entity by comparing the first label with a second label, the second label being associated with the plurality of application programs in said memory or with the locations in said memory, and the second label also being used for initiating reading of one of said plurality of application programs therein.

2. A chip card according to claim 1, wherein the set of instructions further includes a return instruction; and wherein said microprocessor comprises a second register and loads the multibit identification code from said first register to said second register when the call instruction is executed, and at a same time the return instruction causes the contents of said second register to be loaded into said first register.

3. A chip card according to claim 2, wherein said second register cannot be directly accessed.

4. A chip card according to claim 1, wherein the new entity to be executed is one of the plurality of application programs.

5. A chip card according to claim 1, wherein the new entity to be executed causes a hardware event.

6. A chip card according to claim 5, wherein the hardware event resets said microprocessor.

7. A chip card according to claim 1, wherein the set of instructions further includes a return instruction; and wherein said first register is updated in response to the return instruction.

8. A chip card according to claim 1, wherein said checking device provides a control signal to said microprocessor for providing access to the locations in said memory if the new entity to be executed is authorized.

9. A chip card according to claim 1, wherein the plurality of application programs are written in a standardized language.

10. A chip card comprising:
  a microprocessor including an operating system working with a set of instructions including a call instruction and a return instruction, said microprocessor comprising
    a first register for storing a multibit identification code identifying an application program entity to be executed, the call instruction for calling based upon the multibit identification code a new application program to be executed, and for updating said first register during execution of the new application program by storing therein a first label associated with the application program being executed, and
    a second register for loading the multibit identification code from said first register to said second register when the call instruction is executed, and at a same time the return instruction causes the contents of said second register to be loaded into said first register;
  a memory connected to said microprocessor for storing a plurality of application programs; and
  a checking device connected to said microprocessor for receiving the multibit identification code, and for checking whether access to locations in said memory is authorized for the new application program by comparing the first label with a second label, the second label being associated with the plurality of application programs in said memory or with the locations in said memory, and the second label also being used for initiating reading of one of said plurality of application programs therein.

11. A chip card according to claim 10, wherein said second register cannot be directly accessed.

12. A chip card according to claim 10, wherein each application program causes a hardware event.

13. A chip card according to claim 12, wherein the hardware event resets said microprocessor.

14. A chip card according to claim 10, wherein said first register is automatically updated in response to the return instruction.

15. A chip card according to claim 10, wherein said checking device provides a control signal to said microprocessor for providing access to the locations in said memory if the new application program to be executed is authorized.

16. A method for securing access to a chip card comprising a microprocessor including an operating system working with a set of instructions including a call instruction, and a memory connected to the microprocessor for storing a plurality of application programs, the method comprising:
  storing a multibit identification code in a first register identifying an entity to be executed;
  calling a new entity to be executed based upon the multibit identification code stored in the first register;
  updating the first register during execution of the new entity by storing therein a first label associated with the entity being executed; and
  transmitting the multibit identification code from the microprocessor to a checking device, and checking whether access to locations in the memory is authorized for the new entity by comparing the first label with a second label, the second label being associated with the plurality of application programs in the memory or with the locations in the memory, and the second label also being used for reading one of the plurality of application programs therein.

17. A method according to claim 16, wherein the set of instructions further includes a return instruction; and wherein the microprocessor comprises a second register and loads the multibit identification code from the first register to the second register when the call instruction is executed, and at a same time the return instruction causes the contents of the second register to be loaded into the first register.

18. A method according to claim 17, wherein the second register cannot be directly accessed.

19. A method according to claim 16, wherein the new entity to be executed is one of the plurality of application programs.

20. A method according to claim 16, wherein the new entity to be executed causes a hardware event.

21. A method according to claim 20, wherein the hardware event resets the microprocessor.

22. A method according to claim 16, wherein the set of instructions further includes a return instruction; and wherein the first register is updated in response to the return instruction.

23. A method according to claim 16, wherein the checking comprises providing a control signal to the microprocessor for providing access to the locations in the memory if the new entity to be executed is authorized.

24. A method according to claim 16, wherein the plurality of application programs are written in a standardized language.

25. A method for securing access to a chip card comprising a microprocessor and a memory connected thereto for storing a plurality of application programs, the microprocessor including an operating system working with a set of instructions including a call instruction and a return instruction, the method comprising:
  storing a multibit identification code in a first register for identifying an application program to be executed;
  calling a new application program to be executed based upon the multibit identification code;
  updating the first register during execution of the new application program by storing therein a first label associated with the application program being executed;
  loading the multibit identification code from the first register to a second register when the call instruction is executed, and at a same time the return instruction causes the contents of the second register to be loaded into the first register; and
  transmitting the multibit identification code from the microprocessor to a checking device for checking whether access to locations in the memory is authorized for the new application program by comparing the first label with a second label, the second label being associated with the plurality of application programs in the memory or with the locations in the memory, and the second label also being used for initiating reading of one of the plurality of application programs therein.

26. A method according to claim 25, wherein the second register cannot be directly accessed.

27. A method according to claim 25, wherein each application program causes a hardware event.

28. A method according to claim 27, wherein the hardware event resets the microprocessor.

29. A method according to claim 25, wherein the first register is updated in response to the return instruction.

30. A method according to claim 25, wherein checking comprises providing a control signal to the microprocessor for providing access to the locations of the memory if the new application program is authorized.

31. A chip card comprising:

a microprocessor;

a memory connected to said microprocessor for storing a plurality of application programs;

said microprocessor comprising a first register for storing a first code, on at least one check bit, corresponding to a first application program to be executed from said plurality of application programs;

if execution of said first application program requires intervention of a second application program from said plurality of application programs, then said first application program sends a call instruction to said microprocessor requesting such intervention;

said first register being updated based upon the call instruction for storing a second code, on the at least one check bit, corresponding to said second application program to be executed; and a checking device connected to said microprocessor for checking the second code as to whether access to locations in said memory are authorized for said second application program.

32. A chip card according to claim 31, wherein said microprocessor comprises a second register for storing the first code corresponding to said first application program while said second application program is being executed; said first register also being updated based upon the first code.

33. A chip card according to claim 32, wherein after said microprocessor executes said second application program, said first register enables said microprocessor to return to said first application program.

34. A chip card according to claim 32, wherein said second register cannot be directly accessed.

35. A chip card according to claim 31, wherein said first and second application programs are written in a standardized language.

36. A chip card according to claim 35, wherein said first and second application programs are loaded into said memory after the chip card has been fabricated.

37. A chip card according to claim 31, wherein said checking device provides a control signal to said microprocessor for providing access to the locations of said memory if said second application program is authorized.

38. A chip card according to claim 31, wherein said checking device compares the address locations to be accessed in said memory with the second code in said first register.

* * * * *